(12) United States Patent
Mate et al.

(10) Patent No.: US 8,346,220 B2
(45) Date of Patent: Jan. 1, 2013

(54) SIGNALING FOR PUSH-TO-TALK

(75) Inventors: Amit Mate, Chelmsford, MA (US); Satish Ananthaiyer, Tewksbury, MA (US); Gopal Harikumar, Westford, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 1279 days.

(21) Appl. No.: 11/394,646

(22) Filed: Mar. 31, 2006

(65) Prior Publication Data

US 2007/0238442 A1    Oct. 11, 2007

(51) Int. Cl.
*H04M 1/725* (2006.01)

(52) U.S. Cl. .............. 455/412.2; 455/403; 455/466; 455/412.1

(58) Field of Classification Search .......... 455/403
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 2002/0196749 A1 | 12/2002 | Eyuboglu et al. |
| 2003/0043772 A1* | 3/2003 | Mathis et al. .......... 370/338 |
| 2003/0100311 A1 | 5/2003 | Chung et al. |
| 2004/0117498 A1* | 6/2004 | Hashimoto et al. ........... 709/230 |
| 2005/0078653 A1* | 4/2005 | Agashe et al. ................ 370/349 |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2005/0265277 A1* | 12/2005 | Thadasina et al. ............. 370/328 |
| 2005/0288041 A1* | 12/2005 | Gill et al. ....................... 455/458 |
| 2005/0288049 A1* | 12/2005 | Gill et al. ....................... 455/518 |
| 2006/0040693 A1* | 2/2006 | Yoon et al. .................... 455/519 |
| 2006/0046762 A1* | 3/2006 | Yoon et al. .................... 455/519 |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |

(Continued)

FOREIGN PATENT DOCUMENTS

GB    2452688    3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Rafael Pérez-Gutiérrez
*Assistant Examiner* — German Viana Di Prisco
(74) *Attorney, Agent, or Firm* — Fish & Richardson P.C.

(57) ABSTRACT

In addition to other aspects disclosed, a data over signaling message that identifies a recipient access terminal is transmitted from a radio network controller to the sector in response to an attempt by an access terminal on a sector of a wireless network to access a service of the wireless network.

21 Claims, 4 Drawing Sheets

U.S. PATENT DOCUMENTS

Figure 1:
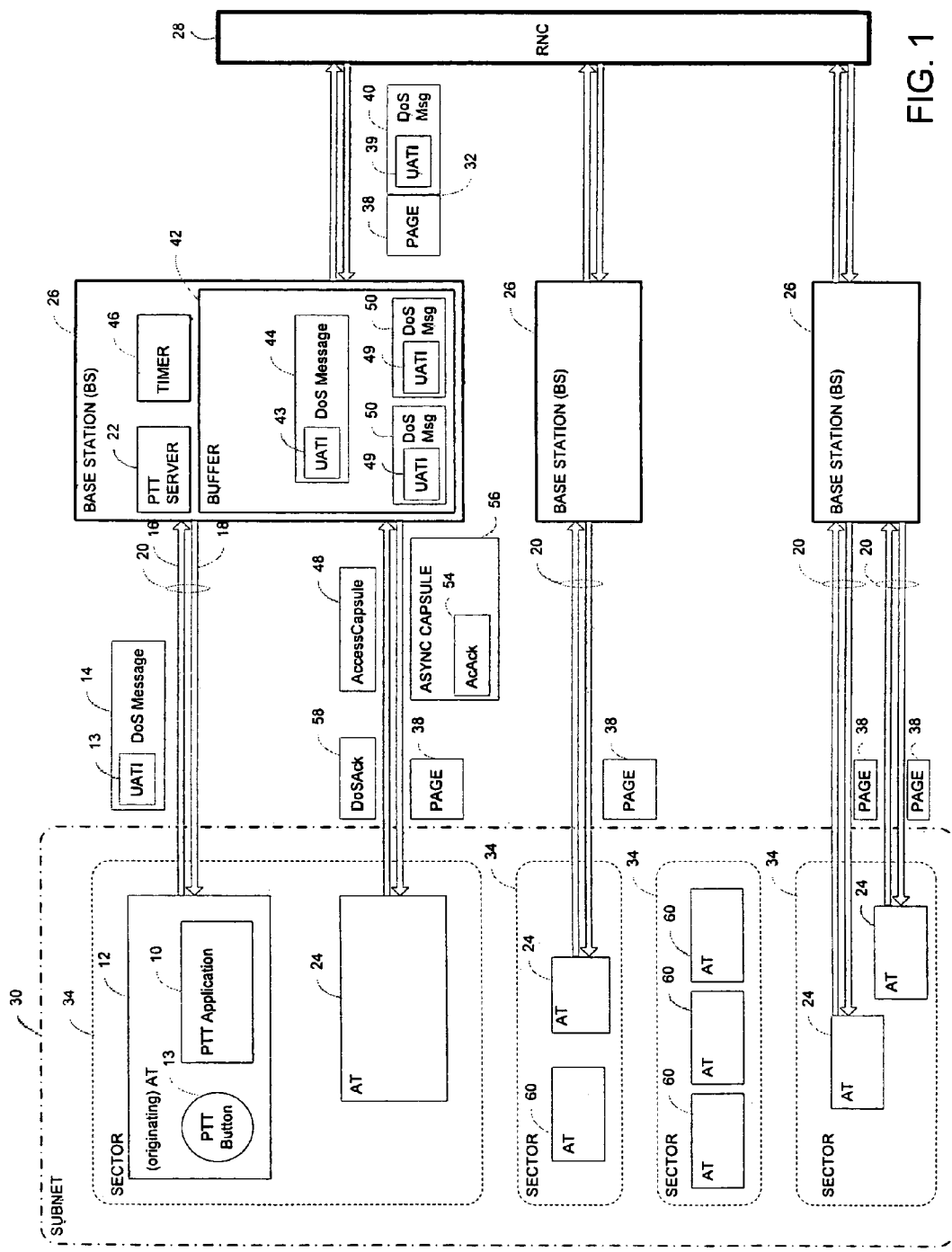

| | | | |
|---|---|---|---|
| 2006/0240782 A1 | 10/2006 | Pollman et al. | |
| 2006/0268871 A1* | 11/2006 | Van Zijst | 370/390 |
| 2006/0276207 A1* | 12/2006 | Harris et al. | 455/466 |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0190963 A1* | 8/2007 | Ananthanarayanan et al. | 455/343.1 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

* cited by examiner

SIGNALING FOR PUSH-TO-TALK

BACKGROUND

This description relates to signaling for push to talk.

A Push-To-Talk (PTT) feature on mobile phones allows a mobile phone to be used as a digital two-way radio. By pressing and holding a PTT button, a user can talk while one or more other uses can listen. PTT connects mobile phone users with each other within seconds and bypasses the call setup time delay required for normal phone dialing. PTT provides a half-duplex communication mode controlled by a button used to switch between voice transmission mode and voice reception mode.

PTT may be implemented to operate over a realization of a EV-DO Rev A standard (also written as 1xEV-DO Rev A or 1x Evolution-Data Optimized Revision A) or another similarly capable standard. EV-DO Rev A is a part of a family of standards by 3GPP2.

The 1xEV-DO protocol is an EVolution of the 1xRTT standard for high-speed data-only (DO) services and has been standardized by the Telecommunication Industry Association (TIA) as TIA/ELA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference.

Some implementations of PTT use an EV-DO Rev A messaging method called DataOverSignaling (DoS) to reduce the latency of push to beep, the time from when the caller pushes the PTT button to when the caller is granted the floor, (i.e., can begin speaking, also called "push to beep" latency). Data Over Signaling in EV-DO Rev-A is a mechanism to transmit "data packets" (i.e., packets whose contents are destined for higher-layer protocols) over a "control channel". The control channel is an always-on link that is traditionally used to carry EV-DO signaling messages. When a user wishes to make a PTT call, the network sends a series of setup-messages between a handset (also referred to as an Access Terminal or AT) and various EV-DO network structures. These structures include Radio Access Networks (Access Network or AN), which are a portion of a mobile phone network that relates to the transmission between an AT and a network Base Station (BS), and Radio Network Controllers (RNC), which work with the BS to act as a link between the wireless devices (e.g. AT) and the Internet. DoS messages are passed between these devices to establish a link between the caller and the receivers.

When a user presses the PTT button on the AT to establish a connection, a message is sent from the AT to a PTT server located on a modem card of a BS. The PTT server then sends the message to an RNC to locate the target ATs. The message carries information designating the target AT. It then becomes the job of the RNC to locate the target ATs and properly establish the necessary link for a PTT connection.

The AN locates the AT by sending a small EV-DO specific signaling message, called the "page" message, over the always-on signaling control channel. The always-on signaling control channel connects the AN to sectors distributed over a geographic area where the AT is presumably located. The page message for a specific AT is sent at one or more specific times. These specific times are pre-agreed between each individual AT and the access network. At these pre-assigned times, the AT switches on its receive function and listens for messages addressed to itself. If the AT receives the page message, the AT then establishes an EV-DO connection with the RAN, over which it can receive user traffic.

Establishing such connections takes time. A long connection time detrimentally affects end-to-end "Push To Beep" time and negatively affects the user-experience.

In establishing the PTT link, some DoS messages are Session Initiation Protocol (SIP) invitations or acknowledgements (SIP INVITES/OK) for Mobile-Originated PTT (MO PTT) calls and Mobile-Terminated PTT (MT PTT) calls. In order to send the PTT message to the AT faster than would be possible with the traditional mechanism described earlier, the RAN has to send the PTT initiation message as a DOS message over the control channel, along with the page message. An AT that needs to send a PTT initiation message can also send it before a connection has been set up, by sending the message as a DOS message over a low rate access channel that exists in the network prior to traffic channel creation to speed up PTT call initiation. Call set-up messages (e.g. SIP INVITE) can be sent over the access channel, allowing for fast initiation of PTT calls. Without this mechanism, each PTT call would have to begin with the establishment of a traffic channel, and this would lead to long set-up times.

While a delay of several seconds in connecting to a server may not be noticeable to some applications, the delay may be noticeable for real-time applications such as voice and PTT. When not active, typical cellular handsets may reduce power usage by entering a sleep mode that may last as long as five seconds between awake states. This increases the latency for call set-up for PTT calls. EV-DO Rev A reduces the latency with the introduction of an Enhanced Idle State Protocol (EISP) that allows shorter sleep periods to speed up call establishment. Enhanced Idle State Protocol supports faster, variable paging.

In using DoS messaging for PTT, a typical vendor could bundle a forward link DoS message (encapsulating a SIP invite) along with a Page message. The forward link DoS message links a fixed location such as a radio node (RN) to a mobile user. A Page message is a message transmitting the ID of another device in order to establish connection with that device. Because the Page message is carried as a part of a synchronous sleep state (synSS) capsule sent on the control channel, the DoS message will also be transported in synSS. If the recipient AT is located in a sector, a network topology subdivision, the recipient AT will receive the DoS message along with the Page message. Typically, using the DoS message, a Page message is flooded to all sectors on a subnet.

For a typical IP_based push-to-talk system, even the smallest message would be 50-60 bytes in length. Commonly used SIP-based push-to-talk systems have messages that are hundreds of bytes long. Special SIP compression techniques are used to limit the initial "invite" messages to a size of less than 120 bytes. For a system that has 300 sectors in a subnet, and a modest PTT load, the control channel capacity (which is defined to be 6 DoS messages/sector/CC cycle at 76.8 Kbps) will constrain the maximum average number of PTT subscribers supported per sector, the average push to beep latency, and a limited maximum average simultaneous PTT calls per sector.

SUMMARY

In general, in some aspects of the invention, in response to an attempt by an access terminal on a sector of a wireless network to access a service of the wireless network, a data over signaling message that identifies a recipient access terminal is transmitted from a radio network controller to the sector. The data over signaling message can be buffered until a determined time has lapsed. A unicast access terminal identifier of the data over signaling message can be used to sort the data over signaling message with respect to other data over signaling messages based on. The data over signaling message can be transmitted in an asynchronous capsule. The data over signaling message can be buffered until the access terminal attempts to access a service of the wireless network. The buffering can be performed in a base station and/or in the radio network controller. The data over signaling message can be transmitted to the recipient access terminal. The service of the wireless network can comprise a push to talk service. The data over signaling message can be used to establish a push to talk communication. The attempt by the access terminal can be in response to a second message. The second message can comprise a paging message. The data over signaling method can comprise a DoS message of EV-DO Rev. A protocol.

The method can further comprise transmitting a page message from a radio network controller to the sector. The data over signaling message can be transmitted in a synchronous capsule. The synchronous capsule can be transmitted outside of a sleep state. The synchronous capsule can be transmitted in a determined paging cycle. The page message can be transmitted in a synchronous sleep state capsule. The data over signaling message can be used to establish a push to talk communication.

In some aspects of the invention, managing a data over signaling message transport facility for a push to talk service is based on at least one of a measure of a forward link slot utilization or a measure of pending data over signaling messages. The measure of forward link slot utilization can be compared to a first configurable threshold value, the pending data over signaling messages metric is compared to a second configurable threshold value, and the first and the second configurable threshold values have different effects on the push to talk service The pending data over signaling messages metric can comprise the number of pending data over signaling messages. The comparison can be carried out on at least one of a radio network controller, or a base station. The managing can be carried out on at least one of a radio network controller, or a base station. The managing can comprise activating the message transport facility. The managing can comprise enabling the message transport facility.

In some aspects of the invention, a signaling link protocol priority is assigned to a message to enable quality of service support. The service can comprise a push to talk service. The priority can be based on a user quality of service level. The message can comprise at least one of a data over signaling acknowledgement message, or a data over signaling message. The quality of service can comprise an inter user quality of service. Different user categories can be associated with different messages. Different messages can be assigned different priorities.

In some aspects of the invention, an apparatus is disclosed comprising a means for providing, in response to an attempt by an access terminal on a sector of a wireless network to access a service of the wireless network, a transmission, from a radio network controller to the sector, of a data over signaling message that identifies a recipient access terminal. The data over signaling message can be transmitted in an asynchronous capsule. The data over signaling message can be buffered until the access terminal attempts to access a service of the wireless network.

In some aspects of the invention, a data over signaling message identifies a recipient access terminal and is transmitted from a radio network controller to a sector in response to an attempt by an access terminal on the sector of a wireless network to access a service of the wireless network. The data over signaling message can be transmitted in an asynchronous capsule. The data over signaling message can be buffered until the access terminal attempts to access a service of the wireless network.

In some aspects of the invention, an apparatus is disclosed comprising a means for providing, in response to an attempt by an access terminal on a sector of a wireless network to access a service of the wireless network, a transmission, from a radio network controller to the sector, of a page message and of a data over signaling message, the data over signaling message identifying a recipient access terminal. At least one of the page message or the data over signaling message can be transmitted in an asynchronous capsule. At least one of the page message or the data over signaling message can be buffered until the access terminal attempts to access a service of the wireless network.

In some aspects of the invention, a page message and a data over signaling message is disclosed comprising the data over signaling message identifying a recipient access terminal, and the data over signaling message transmitted from a radio network controller to a sector in response to an attempt by an access terminal on the sector of a wireless network to access a service of the wireless network. At least one of the page message or the data over signaling message can be transmitted in an asynchronous capsule. At least one of the page message or the data over signaling message can be buffered until the access terminal attempts to access a service of the wireless network.

In some aspects of the invention, a machine-readable medium is disclosed comprising including machine-executable instructions to cause the machine to dynamically optimize data over signaling message transport using at least one of a forward link slot utilization metric, or a pending data over signaling messages metric. The measure of forward link slot utilization can be compared to a first configurable threshold value, the pending data over signaling messages metric can be compared to a second configurable threshold value, and the first and the second configurable threshold values can have different effects on the push to talk service The optimizing can comprise activating the message transport facility. The optimizing can comprise enabling the message transport facility.

In some aspects of the invention, a machine-readable medium is disclosed comprising including machine-executable instructions to cause the machine to assign a signaling link protocol priority to a message to enable quality of service support. The message can comprise at least one of a data over signaling acknowledgement message, or a data over signaling message. The quality of service can comprise an inter user quality of service. The different messages can be assigned different priorities.

In some aspects of the invention, in response to an attempt by a recipient access terminal on a sector of a wireless network to access a service of the wireless network, a data over signaling message that identifies the recipient access terminal receives from at least one of a radio network controller or a base station. The data over signaling message can be transmitted in an asynchronous capsule. The page message can receive from at least one of a radio network controller or a base station. The page message and the data over signaling message may or may not be received back-to-back.

Among the advantages of the techniques described here are one or more of the following.

Because the DoS message is not bundled with the Page message, control channel capacity wastage is reduced by a factor of 1/NumberOfSectorsInSubnet, and the average delay for DoS messages for ATs in a given sector is reduced. Thus, more PTT subscribers are supported per sector.

Push to beep latency is reduced, because typically only one or two DoS messages will be transmitted per sector per control channel cycle.

Forward link sector capacity (and hence number of simultaneous PTT calls per sector) is increased, because the number of forward slots required per control channel cycle @76.8 Kbps for transmitting DoS is reduced to typically 8 from 56, i.e., almost by a factor of 1/MaxDoSMessagesPerSectorPerCCCycle Battery life is extended for all ATs in a Rev-A sector, because of the smaller sleep state capsules.

Inter-user QoS support results in better average delays for high priority user.

Table 1 summarizes the sector throughput and average delay gain for the proposed method as compared to a Page message bundling approach.

the DoS message 44 in a buffer 42, initiates a timer 46, and forwards the Page 38 to all AT's 24, 60 in the sectors controlled by the BS 26. The DoS message 44 is not transmitted immediately but buffered until a configurable timeout period. Each sector 32 has its own buffer 42. Upon receiving a Page acknowledgement in the form of an AccessCapsule message 48 from an intended recipient AT 24, the BS 26 delivers the buffered DoS message 44. However, if the BS 26 does not receive any Page acknowledgements prior to expiration of the timeout period, the DoS message 44 is cleared from the buffer.

The DoS message 14, 40, 44 is identifiable by a Unicast Access Terminal Identifier 13, 39, 43 (UATI). The UATI is a 128-bit address identifier for a High Rate Packet Data (HRPD) device. A 32-bit short version is available for transmission. When the RNC 28 forwards the DoS message 40 to the buffers 42 of the various BS's 26, the DoS message 44 is compiled with any other unexpired DoS messages 50. The

TABLE 1

Available Control Channel Capacity for DoS

| CC rate (Kbps) | Number of 124 byte CC/MAC packets available per CC cycle | Total number of payload bytes available per CC cycle | Bytes used by APM/SPM/QC/Sync/BRR message per CC cycle | Bytes available for DoS/Page/AcAck/DosAck per CC cycle | Max number of 113 byte DoS packets per CC cycle | Number of DoS packets/sector/sec |
|---|---|---|---|---|---|---|
| 38.4 | 4 | 496 | 90 | 406 | 3 | 7.01721557 |
| 76.8 | 8 | 992 | 90 | 902 | 7 | 16.373503 |

Other features and advantages will be apparent from the description and the claims.

DESCRIPTION

Figure 2:
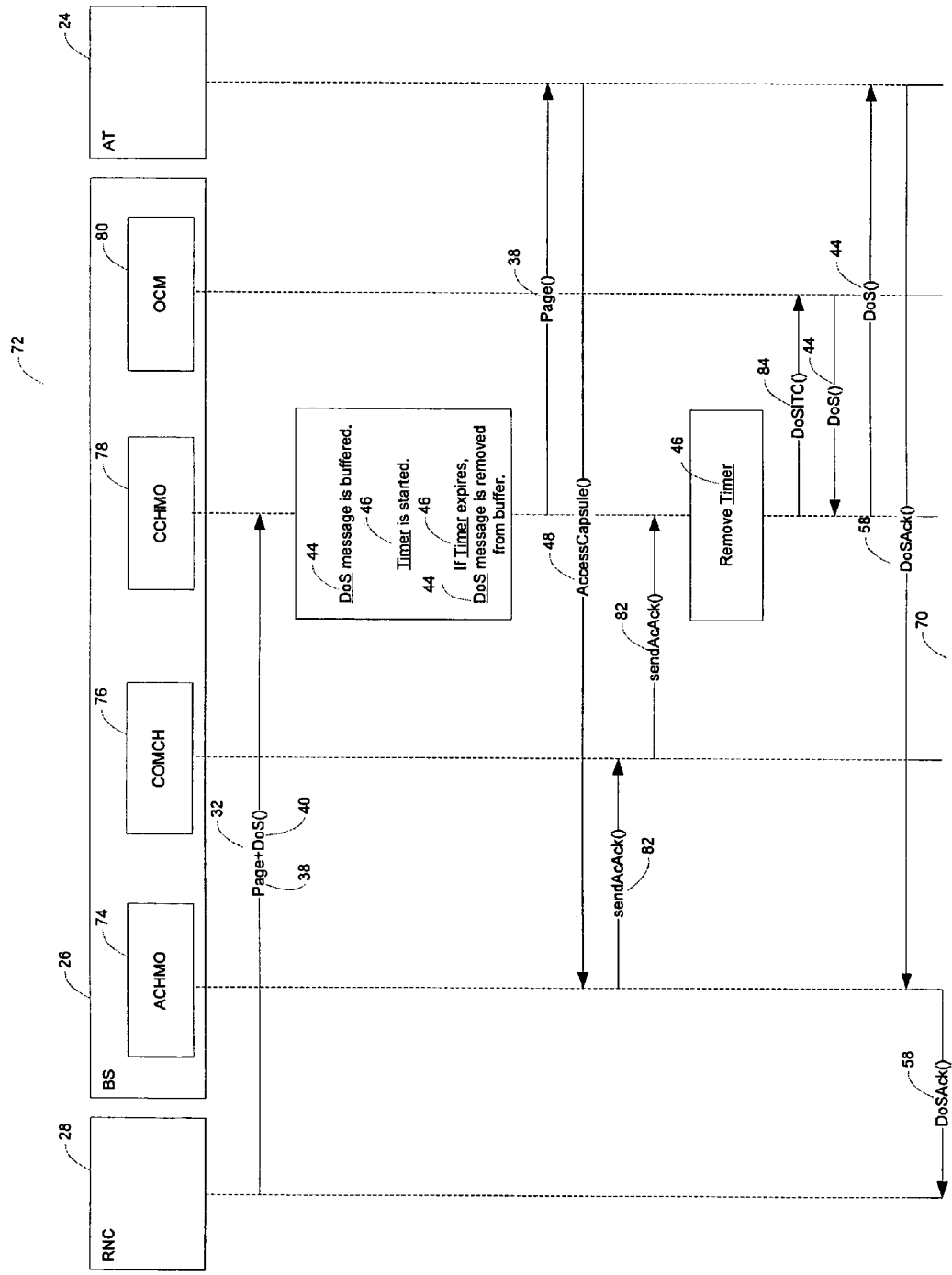
Figure 3:
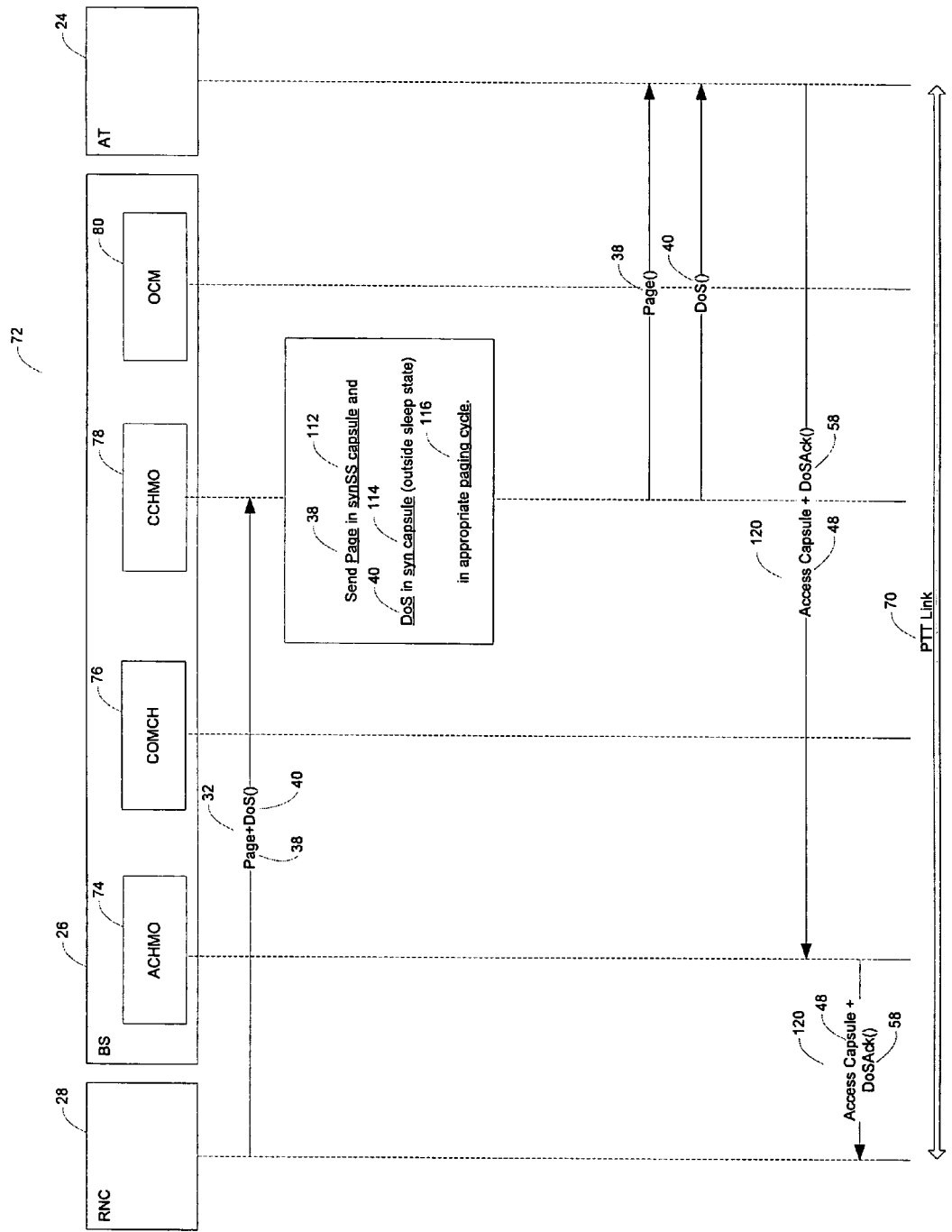
Figure 4:
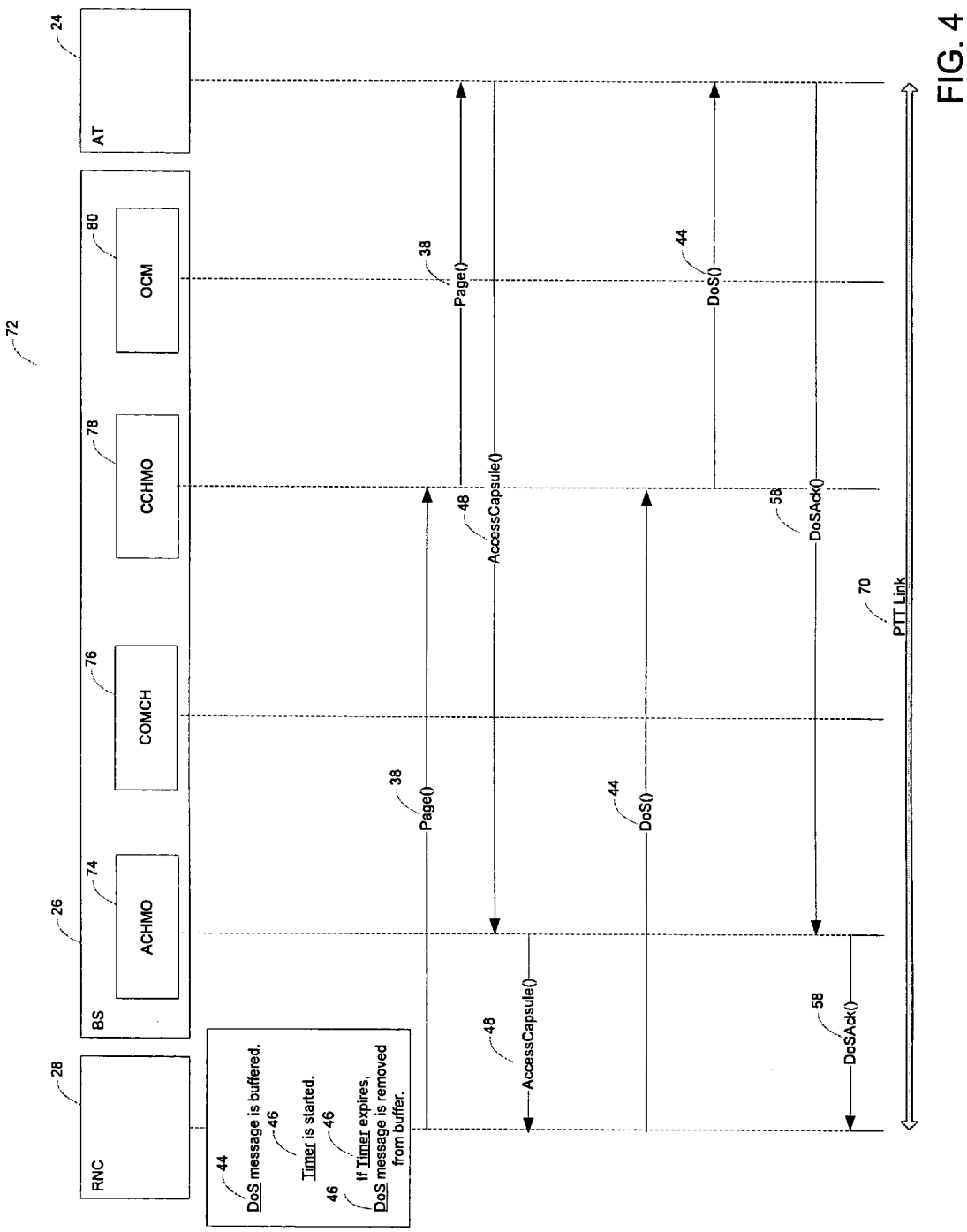

FIG. 1 is a functional block diagram
FIG. 2-4 each shows a flow.

Referring to FIG. 1, in some embodiments, a mobile user wishing to use a Push to Talk (PTT) service would initiate a PTT application 10 of a handset 12, by pressing and holding down a push to talk button 13. The handset 12, also called an originating access terminal 12 (originating AT), sends a DataoverSignaling (DoS) message 14 in a system-defined slot of a forward link 16 of a wireless communication channel 20 to a push to talk server 22 requesting a PTT connection with one or more terminating access terminals 24 (recipient AT). In this example, the recipient ATs 24 are in the same sector 34 as the originating AT, but in other examples the recipient ATs could be in other sectors, other cells, or other networks. The push to talk server 22, located on a base station 26 (BS), forwards the request to a radio network controller 28 (RNC) for location of the recipient ATs 24 and completion of the DoS message delivery. The forward link 16 connects an originating AT 12 with a fixed location, such as the BS 26 or the RNC 28, and permits the mobile user to transmit information to the fixed location.

Upon receiving the DoS message 14 from the PTT server 22, the RNC 28, which defines and serves a subnet 30, sends a Page+DoS message 32 (FIG. 2) to all BS's 26 within the subnet 30. The subnet 30 is defined by the RNC 28 based on network topology and is divided into sectors 34. The Page+DoS message 32 is sent to the BS's 26 as back-to-back messages on a control channel 36, which is a logic channel that carries network information rather than actual voice or data information. The Page+DoS message 32 is a back-to-back transmission of a Page message 38 followed by a DoS message 40. Upon receiving the transmission, the BS 26 retains compilation is sorted based on the UATI of each message. During the period the DoS message 44, 50 exists in the buffer 42, the message 44, 50 waits for an access attempt from a recipient ATs 24.

However, not all ATs contacting the BS 26 will receive the DoS message 14, 40, 44. When a recipient AT 24 attempts access but before the BS 26 sends an AcAck 54 to the AT 24, the BS 26 checks for any pending DoS 44, 50 message in the sector's 34 DoS buffer 42. The AcAck message 54 is a message sent from the BS 26 to the AT 24 confirming the location registration. If a pending DoS message 44, 50 designated for that AT 24 is found, the DoS message 44, 50 is bundled with the AcAck 54 and is transmitted in an asynchronous capsule 56 (async capsule). By capsule, we mean a data structure that may enclose one or more records such as a message. The async capsule 56 is locally constructed on the base station 26 to transmit the DoS message 44, 50. Upon receiving the AcAck 54, the receiving AT 24 sends to the BS 26 (and subsequently the RNC 28) a DoSAck 58 message acknowledging the receipt of the DoS message 44, 50 thereby establishing the connection. A non-recipient AT 60 contacting the BS 26 would not receive the DoS message 44, 50 because the DoS message 44, 50 is not designated for that non-recipient AT 60.

Referring to FIG. 2, the PTT link 70 can be established even more efficiently using a DoS message transport 72 in which the DoS message 40 is transmitted from the RNC 28 and a DoSAck( ) 58 is received from a recipient AT 24 using the following functional objects: the RNC 28, an AccessChannelMacObject 74 (ACHMO), a CommonChannel 76 (COMCH), a ControlChannelMacObject 78 (CCHMO), a OverheadChannelManager 80 (OCM), and the recipient AT 24. The ACHMO 74 handles the AccessCapsule 48 received from the AT 24. The ACHMO 74 decodes the contents of the AccessCapsule 48 and forwards it for further processing. The COMCH 78 handles the communication between the ACHMO 74 and the CCHMO 78. The CCHMO 78 handles all forward link control channel messages. Additionally, the CCHMO 78 packs together all objects that are placed on the control channel. The OCM 80 controls an access channel and provides information on registered states of all access terminals.

In the optimized DoS message transport 72, The RNC 28 sends a Page+DoS( ) message 32 to the CCHMO 78. The Page+DoS( ) message 32 is a back-to-back transmission of a Page message 38 followed by a DoS message 40. The CCHMO 78 separates the Page+DoS( ) message 32 into the Page( ) message 38 and the DoS( ) message 40. The CCHMO 78 retains the DoS( ) message 40 and forwards the Page( ) message 38 to the recipient AT 24. The Page( ) message 38 contains an AT identifier so that the AT 24 knows that it is being paged. The DoS( ) message 44 is placed in the buffer 42 and a timer 46 is started. The timer 46 enables a timeout based flushing. A control channel cycle counter (not shown) is initialized to an initial value (such as 0 or 1) and is incremented every control channel cycle (not shown). Upon reaching a configurable (hard-coded) threshold (not shown), the DoS messages 44 is cleared from the buffer 42.

To reduce the total bandwidth required to establish the PTT Link 70, the CCHMO 78 buffers the DoS message 44 and sends the Page( ) message 38 to the recipient AT 24. Upon receiving the Page( ) message 38, the recipient AT 24 responds to the Page( ) message 38, and thereby identifying itself, by sending an AccessCapsule( ) message 48 to the ACHMO 74. The AccessCapsule( ) message 48 contains two messages, a ConnectionRequest message and a RouteUpdate message. The RouteUpdate message contains information about the strength of base station signals as detected by the AT 24. The base station with the strongest signal is most likely to provide service to the AT 24. This response is the recipient AT's 24 response to acknowledging the Page( ) message 38. Upon receiving the AccessCapsule( ) message 48, the ACHMO 74 sends an Access Acknowledge message 82 (sendAcAck( ) message) to the COMCH 76. The COMCH 76 forwards the received sendAcAck( ) message 82 to CCHMO 78.

Receiving the sendAcAck( ) message 82 from the COMCH 76 signals to the CCHMO 78 that the Page( ) message 38 was acknowledged by the intended recipient AT 24 and that an AccessCapsule( ) message 48 was sent from the recipient AT 24. This allows the CCHMO 78 to initiate the process of sending the DoS( ) message 40 to the recipient AT 24.

First, the CCHMO 78 removes the timer 46 to avoid timeout based flushing since the intended recipient AT 24 has been located successfully. Next, the CCHMO 78 sends an Inter-DoS Communication Method message 84 (DoSITC) to the OCM 80. The DoSITC( ) message 84 is a local message containing the DoS( ) message 40. The OCM 80 responds to the DoSITC( ) message 84 by parsing the DoS( ) message 40 from the DoSITC( ) message 84 and sending the DoS( ) message 40 to the CCHMO 78. The CCHMO sends the DoS( ) message 40 from the OCM 80 to the recipient AT 24. Upon receiving the DoS( ) message 40, the recipient AT completes the PTT link 70 by sending the DoSAck( ) 58 to the ACHMO 74 and the ACHMO 74 forwards the DoSAck( ) 58 to the RNC 28. The DoSAck( ) message 58 is optional and is requested by the sender.

A configurable parameter per sector, such as a DoS optimization switch, enables this improved transport. By changing the parameters of respective sectors, various levels of efficiencies are achieved. For example, changing the timer 46 affects the maximum allowed time before the network considers the recipient AT 24 undetected. Changing the timer 46 also affects the number of pages sent prior to timeout. With a longer timeout, less bandwidth is available for other pages and fewer average simultaneous PTT calls per sector are supported.

Referring to FIG. 3, if the improved transport is not enabled, the DoS messages 40 are sent on a synchronous capsule outside the sleep state. Only those DoS messages are included for which Page messages are sent in the sleep state part of the synchronous communication channel. An EPF scheme, a scheme that orders incoming packets, for queuing DOS per-phase packets is proposed. In the EPF scheme, the earliest packet is dropped first and the last packet to arrive is placed first in a queue. When the queue is full, a new arriving packet is placed in front of queue and the oldest packet at the end of the queue is dropped. Such a scheme would reduce the average DOS packet delay in forward direction. Improving the average delay performance of the DoS packets reduces the number of dropped DoS packets.

As in the improved transport, the Page+DoS( ) message 32 is send from the RNC 28 to the CCHMO 78 and the CCHMO 78 parses the Page+DoS( ) message 32 into the Page( ) message 38 and the DoS( ) message 40. However, instead of buffering the DoS( ) message 40, the Page( ) message 38 is sent in a synchronous sleep state capsule 112 (synSS capsule) and the DoS( ) message 40 is sent in a synchronous capsule 114 (syn capsule) in an appropriate paging cycle 116. Unlike the synSS capsule 112, the syn capsule 114 occurs outside the sleep state. Both the Page( ) message 38 and the Dos( ) message 40 originate from the CCHMO 78 and is directed to the recipient AT 24. When the recipient AT 24 receives both messages, the AT 24 sends an AccessCapsule+DosAck( ) 120 message to the ACHMO 74. The ACHMO 74 then forwards the AccessCapsule+DosAck( ) 120 message to the RNC 28, thereby establishing the PTT Link 70.

This approach reduces total wait time prior to timing out. However, the total bandwidth usage is higher because the DoS( ) message 40 is sent to all AT's 24, 60 thereby increasing the total bandwidth usage and reducing the average simultaneous PTT calls per sector.

Referring to FIG. 4, in some embodiments, the implementation of DoS messages on the RNC 28 is changed to support the enhanced implementation of DoS message 44 buffering at the RNC 28 level. Here, the DoS message 44 is buffered and a timeout timer 46 is started. The RNC 28 then proceeds with issuing a Page message 38 and locating the recipient AT 24. The Page message 38 is sent to the CCHMO 78, which forwards the Page message 38 in an async capsule to the recipient AT 24. The recipient AT 24 responses to the page, thereby identifying itself, by sending an AccessCapsule 48 to the ACHMO 74, which forwards the ACHMO 74 to the RNC 28. When the RNC 28 receives the AccessCapsule 48, it sends to the CCHMO 78 the DoS( ) message 44 (assuming the buffer has not be flushed due to timeout). The CCHMO 78 relays the DoS message 44 to the recipient AT 24. The recipient AT 24 completes the PTT Link 70 by sending the acknowledgement message, DoSAck( ) 58, to the ACHMO 74, which forwards the message onto the RNC 28.

The timer 46 enables a timeout based flushing. A control channel cycle counter (not shown) is initialized to an initial value (such as 0 or 1) and is incremented every control channel cycle (not shown). Upon reaching a configurable (hard-coded) threshold (not shown), the DoS messages 44 is cleared from the buffer 42 in the RNC.

This approach has the advantages of conserving RNC 28 to BS 26 bandwidth and of retaining DoS messaging control at the RNC level. However, the timer's 46 timing parameters will require adjustment because the recipient AT access attempts are detected at a higher level in the hierarchy. More processing resources is required of the RNC 28 in this approach because the RNC 28 is now handling the processing and buffering/caching, both of which was previously handled by the BS 26.

In some embodiments, the optimized DoS message transport 72 is dynamically enabled. The pending DoS messages 44, 50 in the buffer 42 are compared to a configurable threshold. The forward link slot utilization is compared to a second configurable threshold. If the number of pending DoS messages 44, 50 in the buffer is less than the configurable threshold, or if the forward link slot utilization is below the second configurable threshold, the optimization is automatically enabled. Depending on the implementation, the RNC 28 and/or the BS 26 can carry out the comparisons and optimization.

In some embodiments, an Inter user Quality of Service (QoS) support is added by assigning different Signaling Link Protocol (SLP) priorities (e.g. 20, 30, 40, 50) to DoSAck 58 and DoS messages 44 for different users (e.g. Gold, Silver and Bronze users). The Signaling Link Protocol (SLP) is used for reliable transfer of a signaling message, which is prioritized to support QoS. The DoSAck messages 58 are transported in a non-optimized scheme. In constructing the async capsule 34, priority is given to users with better QoS.

Other embodiments are within the scope of the following claims.

What is claimed is:

1. A method performed in a radio network controller, the method comprising:
   receiving, from an originating access terminal, a data over signaling (DoS) message that identifies a recipient access terminal; and
   transmitting, to a radio node, back-to-back messages that comprise a page message and the data over signaling message, the back-to-back messages causing a radio node to:
      store the data over signaling message in a buffer;
      sort the data over signaling message with respect to other data over signaling messages based on a unicast access terminal identifier of the data over signaling message;
      transmit the page message to one or more sectors of the radio node; and
      if a response to the page message is received from the recipient access terminal before the expiration of a timeout period, transmit the data over signaling message to the recipient access terminal; and
      if a response to the page message is not received before the expiration of the timeout period, clear the data over signaling message from the buffer;
   wherein the timeout period is based on a count of control channel cycles.

2. The method of claim 1 wherein the data over signaling message is transmitted in an asynchronous capsule.

3. The method of claim 1 wherein the data over signaling message is used to establish a push to talk communication.

4. The method of claim 1 wherein the data over signaling message is buffered until a determined time has lapsed.

5. The method of claim 1 also comprising sorting the data over signaling message with respect to other data over signaling messages based on a unicast access terminal identifier of the data over signaling message.

6. The method of claim 1 in which the data over signaling message comprises a DoS message of EV-DO Rev. A protocol.

7. The method of claim 1 wherein the data over signaling message is transmitted in a synchronous capsule.

8. The method of claim 7 wherein the synchronous capsule is transmitted outside of a sleep state.

9. The method of claim 7 wherein the synchronous capsule is transmitted in a determined paging cycle.

10. The method of claim 1 wherein the page message is transmitted in a synchronous sleep state capsule.

11. The method of claim 1, further comprising compiling the DoS message with other unexpired DoS messages associated with the UATI of the DoS message.

12. An apparatus comprising:
   a radio network controller comprising:
      means for receiving, from an originating access terminal, a data over signaling (DoS) message that identifies a recipient access terminal; and
      means for transmitting, to a radio node, back-to-back messages that comprise a page message and the data over signaling message, the back-to-back messages causing a radio node to:
         store the data over signaling message in a buffer;
         sort the data over signaling message with respect to other data over signaling messages based on a unicast access terminal identifier of the data over signaling message;
         transmit the page message to one or more sectors of the radio node; and
         if a response to the page message is received from the recipient access terminal before the expiration of a timeout period, transmit the data over signaling message to the recipient access terminal; and
         if a response to the page message is not received before the expiration of the timeout period, clear the data over signaling message from the buffer;
      wherein the timeout period is based on a count of control channel cycles.

13. The apparatus of claim 12 wherein the data over signaling message is transmitted in an asynchronous capsule.

14. A method performed in a radio network controller, the method comprising:
   receiving, from an originating access terminal, a data over signaling (DoS) message that identifies a recipient access terminal; and
   transmitting, to a radio node, back-to-back messages that comprise a page message and the data over signaling message, the back-to-back messages causing a radio node to:
      store the data over signaling message in buffers that correspond to respective sectors of the radio node;
      sort the data over signaling message with respect to other data over signaling messages based on a unicast access terminal identifier of the data over signaling message;
      transmit the page message to one or more sectors of the radio node; and
      if a response to the page message is received from the recipient access terminal before the expiration of a timeout period, transmit the data over signaling message to the recipient access terminal from the buffer that corresponds to the sector where the recipient access terminal is located; and
      if a response to the page message is not received before the expiration of the timeout period, clear the data over signaling message from the buffer;
   wherein the timeout period is based on a count of control channel cycles.

15. A method performed in a radio node, the method comprising:

receiving, from a radio network controller, back-to-back messages that comprise a page message and a data over signaling (DoS) message;

in response to receiving the back-to-back messages:
storing the data over signaling message in a buffer;
sort the data over signaling message with respect to other data over signaling messages based on a unicast access terminal identifier of the data over signaling message;
transmitting the page message to one or more sectors of the radio node; and
if a response to the page message is received from the recipient access terminal before the expiration of a timeout period, transmitting the data over signaling message to a recipient access terminal; and
if a response to the page message is not received before the expiration of the timeout period, clearing the data over signaling message from the buffer;

wherein the timeout period is based on a count of control channel cycles.

16. The method of claim 15 wherein the data over signaling message is transmitted in an asynchronous capsule.

17. The method of claim 15 wherein the data over signaling message is used to establish a push to talk communication.

18. The method of claim 15 wherein the data over signaling message is buffered until a determined time has lapsed.

19. The method of claim 15 also comprising sorting the data over signaling message with respect to other data over signaling messages based on a unicast access terminal identifier of the data over signaling message.

20. The method of claim 15 in which the data over signaling message comprises a DoS message of EV-DO Rev. A protocol.

21. A method performed in a radio node, the method comprising:

receiving, from a radio network controller, back-to-back messages that comprise a page message and a data over signaling (DoS) message;

in response to receiving the back-to-back messages:
storing the data over signaling message in buffers that correspond to respective sectors of the radio node;
sort the data over signaling message with respect to other data over signaling messages based on a unicast access terminal identifier of the data over signaling message;
transmitting the page message to one or more sectors of the radio node; and
if a response to the page message is received from the recipient access terminal before the expiration of a timeout period, transmitting the data over signaling message to a recipient access terminal from the buffer that corresponds to the sector where the recipient access terminal is located; and
if a response to the page message is not received before the expiration of the timeout period, clear the data over signaling message from the buffer;

wherein the timeout period is based on a count of control channel cycles.

* * * * *